US011205249B2

(12) United States Patent
Arora et al.

(10) Patent No.: US 11,205,249 B2
(45) Date of Patent: Dec. 21, 2021

(54) TABLE SHIFTING AND SKEWING

(71) Applicant: Adobe Inc., San Jose, CA (US)

(72) Inventors: Aman Arora, New Delhi (IN); Rohit Kumar Dubey, Chittorgarh (IN)

(73) Assignee: Adobe Inc., San Jose, CA (US)

(*) Notice: Subject to any disclaimer, the term of this patent is extended or adjusted under 35 U.S.C. 154(b) by 215 days.

(21) Appl. No.: 16/683,813

(22) Filed: Nov. 14, 2019

(65) Prior Publication Data
US 2021/0150670 A1    May 20, 2021

(51) Int. Cl.
*G06T 3/60* (2006.01)
*G06T 11/60* (2006.01)
*G06T 11/20* (2006.01)

(52) U.S. Cl.
CPC ............ *G06T 3/608* (2013.01); *G06T 11/206* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,115,070 A * | 9/2000 | Song | H04N 19/48 375/240.12 |
| 8,085,848 B2 * | 12/2011 | Kurata | H04N 5/23248 375/240.16 |
| 8,301,298 B2 * | 10/2012 | Bisse | B65G 43/08 700/230 |
| 10,592,184 B2 * | 3/2020 | Yu | G06K 9/00449 |
| 10,628,918 B2 * | 4/2020 | Peterson | G06T 17/30 |
| 10,706,500 B2 * | 7/2020 | Peterson | G06T 17/30 |
| 10,832,376 B2 * | 11/2020 | Peterson | G06T 7/13 |
| 2002/0154117 A1 * | 10/2002 | Saitou | G06T 11/206 345/440 |
| 2007/0195172 A1 * | 8/2007 | Kurata | G06T 5/003 348/208.99 |
| 2010/0057248 A1 * | 3/2010 | Bisse | B65G 43/08 700/229 |
| 2016/0125583 A1 * | 5/2016 | Amanullah | G06T 7/337 348/87 |
| 2019/0302987 A1 * | 10/2019 | Worsham | G06T 11/60 |
| 2020/0098086 A1 * | 3/2020 | Peterson | G06T 3/0093 |

* cited by examiner

*Primary Examiner* — Anand P Bhatnagar
(74) *Attorney, Agent, or Firm* — FIG. 1 Patents

(57) ABSTRACT

Generating a table with at least one skewed row, skewed column, shifted row, or shifted column is described. A table generation system generates a table that includes cells arranged in a grid comprising rows and columns, and defines each cell using a grid address, a grid span, a grid angle, a string skew value, a string shift value, and a shift indicator for the cell. The table generation system may receive input modifying a grid angle for at least one row or column and generate a modified table by skewing cells included in the at least one row or column by the grid angle. The table generation system may additionally or alternatively receive input shifting at least one row or column by a string shift value and modify the display of the table by shifting the at least one row or column according to the string shift value.

20 Claims, 9 Drawing Sheets

TABLE SHIFTING AND SKEWING

Tables that arrange data in cells organized in rows and columns are able to present large amounts of complex information as well as information defined by different units of measurement in a manner that is easy to understand. For instance, health providers frequently use tables to organize information defined by disparate units of measurement or variables, such as blood pressure, heart rate, number of drugs administered, anesthesia time, and so forth. As such, tables are used by a diverse range of users to represent and convey both qualitative and quantitative data. Although use of tables is widespread, conventional approaches for designing tables provide limited flexibility in creating and defining table structures. In particular, conventional approaches are unable to generate tables with slanted rows or columns and are unable to shift individual rows or columns relative to an overall grid structure of the table.

To mitigate these problems, some conventional table design approaches modify a table's appearance to give the illusion of slanted rows or columns. To do so, these conventional approaches enable a user to modify a font alignment angle for text within a table cell and draw lines that are parallel and perpendicular to the font alignment angle, thereby giving the appearance of cell borders that square with the font alignment angle. However, these conventional approaches are merely cosmetic and do not modify the underlying structure of the cell, such that when a cosmetically modified cell is selected (e.g., to enter or modify data in the cell), the underlying structural borders of the cell are visibly distinct from the lines drawn based on the modified font alignment angle. Similarly, conventional table design approaches do not enable creation of a table with rows or columns shifted by one or more cells, relative to other rows or columns, along horizontal or vertical axes for the table.

SUMMARY

A system and techniques for generating a table with at least one skewed row, skewed column, shifted row, or shifted column are described. A table generation system generates a table that includes cells arranged in a grid comprising at least one row and at least one column. Each cell is generated to include properties that specify a grid address, a grid span, a grid angle, a string skew value, a string shift value, and a shift indicator for the cell. These properties define a visual appearance of each cell as output during display of the table. In some implementations, the table generation system receives input modifying a grid angle for one or more of the rows or one or more of the columns included in the table. In response to receiving this input, the table generation system modifies the grid angle for each cell included in the one or more rows or the one or more columns. In some implementations, in response to determining that one of the cells having a modified grid angle includes text, the table generation system is configured to adjust a baseline for the text to align with the cell's modified grid angle. The table generation system then outputs a display of the modified table.

The table generation system is further configured to receive an indication of one or more of the rows or one or more of the columns of the table and a value by which cells of the one or more of the rows or the one or more of the columns are to be shifted in the table. In response to receiving this indication, the table generation system is configured to modify the display of the table by adjusting the string shift value for each cell included in the one or more rows or the one or more columns and shift the cells across the grid according to the string shift value. To enable the table shifting and skewing operations described herein, the table generation system is further configured to output a user interface that includes controls for facilitating the selection of rows and columns and specifying values by which cells of the table are to be shifted or skewed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
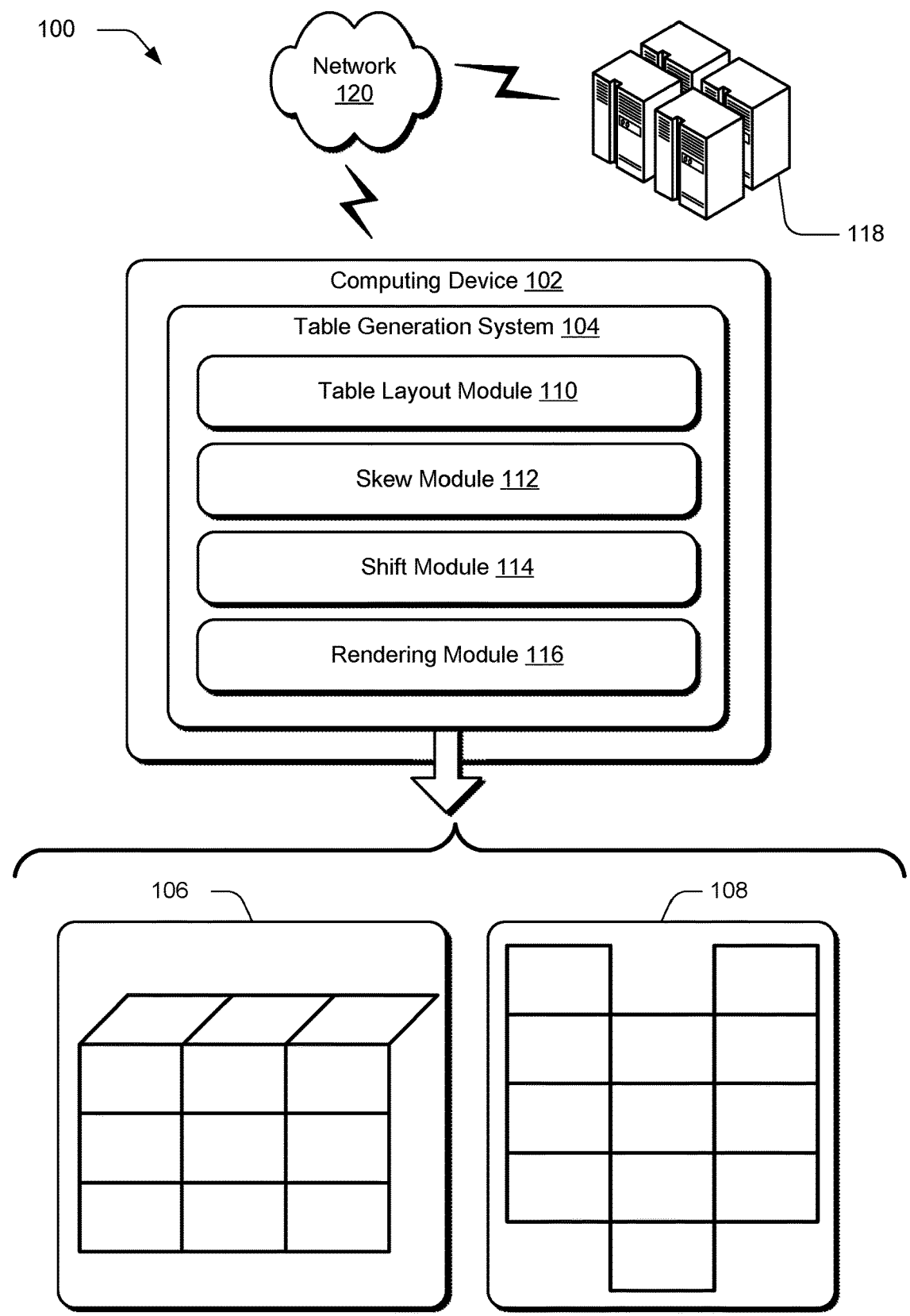
FIG. 1 is an illustration of an environment in an example implementation that is operable to employ the table shifting and skewing techniques described herein.

Tables are frequently used in diverse types of digital content to present data in a manner that is easy to understand, even when the presented data is quantified and qualified by different variables, units of measurement, and so forth. However, despite the widespread use of tables, conventional table design approaches are restricted to generating rectangular cells organized in a grid spanning x rows by y columns, where x and y each represent any suitable integer. Although conventional approaches enable individual row and column resizing operations as well as cell merger operations for users to customize the table's appearance, conventional approaches are restricted in that external cells (e.g., leftmost, rightmost, top, and bottom) of the table must remain aligned with one another. Furthermore, conventional approaches restrict the structure of a cell to be rectangular in nature, with constraints that define the cell's appearance in a table based on a location of the cell relative to rows and columns of the table, dimensions of the cell, and areas (e.g., rows and/or columns) of the table across which the cell spans.

Consequently, users of conventional systems wishing to generate a table that diverts from a rectangular grid comprising rectangular cells are forced to generate a table-like structure on a block-by-block basis. In such a scenario, users are either forced to draw individual cells of a table with vector lines that define cell borders. Alternatively or additionally, users of these conventional systems may generate multiple different tables and visually align the multiple different tables to give the appearance of a single table that includes shifted table rows or columns. However, these conventional system limitations result in significant drawbacks for subsequent table management operations.

For instance, drawing cell borders using vector graphics renders it impossible to navigate from one cell to another, as otherwise afforded by conventional table structures. Drawing cell borders with vector graphics additionally requires defining a separate text box or data construct within the drawn cell borders to enable entry and display of text or other data. Further, drawing cell borders using vector graphics it impossible to select cells of entire rows or columns via a single input. In a similar manner, conventional approaches that visually position multiple different tables relative to one another are limited in that navigation among cells is restricted to cells of an individual one of the multiple different tables. Likewise, a single table-like structure generated from multiple different tables does not enable selection of cells from different ones of the multiple different tables via a single input.

Under conventional table generation approaches, generating tables with shifted or skewed columns or rows involve mimicking table-like structure, which fail to exploit advantages otherwise offered by an actual table, such as simultaneously modifying styles for multiple cells of the table, navigating among cells of the table, referencing data included in other cells of the table, resizing or shaping multiple cells simultaneously, selecting entire rows or columns via a single input, and so forth. Furthermore, conventional approaches are labor intensive and require significant amounts of manual effort to generate such a table (e.g., via repetitive inputs to define and join multiple lines to achieve a table-like structure). Consequently, conventional approaches to generating table-like structures with shifted or skewed columns requires significant amounts of computational resources to process and store data associated with the repetitive inputs, which exponentially increase with a scale in size of the table being created.

Accordingly, techniques for generating a table with one or more of a skewed row, a skewed column, a shifted row, or a shifted column are described. A table generation system generates a table that includes cells arranged in a grid comprising at least one row and at least one column. The table generation system defines a visual appearance of each cell as including properties that specify a grid address, a grid span, a grid angle, a string skew value, a string shift value, and a shift indicator for the cell. The grid address describes coordinates for a row and a column of the table in which an upper left corner of the cell is located. The grid span specifies coordinates that describe a number of rows or columns of the table across which the cell spans, relative to the row and column indicated by the grid address for the cell. The grid angle specifies an angle at which borders of the cell are skewed relative to a horizontal (e.g., x-axis) or vertical (e.g., y-axis) baseline for the table. The string skew value indicates whether the entire row in which the cell is included, the entire column in which the cell is included, or neither, are skewed by the grid angle. The string shift value specifies an integer indicating an amount of rows or columns by which the cell is to be shifted in the table structure, and the shift indicator specifies whether the entire row in which the cell is included, the entire column in which the cell is included, or neither, are shifted by the string shift value.

The table generation system then outputs a visual display of the table that includes any suitable number of cells having a visual appearance specified by a grid address, a grid span, a grid angle, a string skew value, a string shift value, and a shift indicator. In some implementations, the table generation system further outputs a user interface that includes controls for shifting and skewing table rows and columns. In response to receiving a selection or indication of cells that are to be shifted or skewed in the table, as well as values by which the cells are to be shifted or skewed, the table generation system modifies the appropriate properties of the cell(s) to reflect the shift or skew, while maintaining relationships between modified and unmodified cells of the table. In this manner, the table generation system enables shifting and skewing of table cells while preserving the ability for a user to uniformly select, modify, and navigate among different cells of the table.

Furthermore, because the techniques described herein enable shifting and skewing of table cells by defining individual cells using a grid address, a grid span, a grid angle, a string skew value, a string shift value, and a shift indicator, the table generation system is configured to scale and accommodate any size of table or expansion thereof, such that cells of rows and columns added subsequent to a shifting or skewing operation are automatically assigned properties based on properties of their adjacent cells. In this manner, the table generation system automatically modifies text or other data included in an individual cell to align with visual modifications resulting from a shifting or skewing operation. For instance, the techniques described herein automatically adjust a baseline for text glyphs included in a cell to correspond with the grid angle for the cell, without forcing a user to draw a text box independent of the table, as otherwise required by conventional approaches.

In contrast to conventional approaches, the techniques described herein enable creation of non-rectangular cells to generate a table structure, where individual cells are defined to accommodate shifting and skewing parameters that enable the shifting of cells by a specified number of rows or columns and the skewing of cells by a certain degree. The techniques described herein further generate tables that comply with accessibility rules set forth in various electronic and information technology standards, enable logical reading and navigation orders, and preserve table text editing capabilities within cells. Additionally, the techniques described herein reduce an amount of manual inputs otherwise required by conventional approaches to generate table-like structures with shifted or skewed cells, and consequently reduce a number of computational operations and resources required to generate such a structure.

Example Environment

FIG. 1 is an illustration of a digital medium environment 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 9.

The computing device 102 is illustrated as including a table generation system 104. The table generation system 104 represents functionality of the computing device 102 to generate a table including a plurality of cells arranged in a grid defined by at least one row and at least one column. In such a grid structure, a row includes cells disposed horizontal to one another, such as along a line parallel to an x-axis for the table, and a column includes cells disposed vertical to one another, such as along a line parallel to a y-axis for the table. The table generation system 104 further represents functionality of the computing device 102 to generate a table including one or more skewed rows or columns, such as table 106, a table including one or more shifted rows or columns, such as table 108, and combinations thereof.

To generate a table including rows or columns that are shifted or skewed using the techniques described herein, the table generation system 104 employs a table layout module 110, a skew module 112, a shift module 114, and a rendering module 116. The table layout module 110, the skew module 112, the shift module 114, and the rendering module 116 are each implemented at least partially in hardware of the computing device 102 (e.g., through use of a processing system and computer-readable storage media), as described in further detail below with respect to FIG. 9.

The table layout module 110 is configured to generate a table including certain cell properties that can be adjusted to modify a visual appearance of the table by skewing one or more rows or columns of the table, shifting one or more rows or columns of the table, or combinations thereof. To do so, the table layout module 110 defines each cell of the table to include properties that specify a grid address, a grid span, a grid angle, a string skew value, a string shift value, and a shift indicator, as described in further detail below with respect to FIG. 2.

The skew module 112 is configured to generate a table including one or more skewed rows or columns, such as illustrated in table 106, which includes a top row of cells skewed by an angle. To do so, the skew module 112 modifies the grid angle and the string skew value for cells in the top row of table 106, as described in further detail below with respect to FIG. 3. The shift module 114 is configured to generate a table including one or more shifted rows and/or one or more shifted columns, such as illustrated in table 108, which includes a middle column shifted by one row. To do so, the shift module 114 modifies the string shift value and a shift indicator for cells in the middle row of table 108, as described in further detail below with respect to FIG. 4. In accordance with one or more implementations, the skew module 112 and the shift module 114 may collaborate to generate a table that includes both shifted and skewed cells, as described in further detail below with respect to FIG. 5.

The rendering module 116 is representative of functionality to output a table generated by the table generation system 104, such as a display of tables 106 and 108. The rendering module 116 is further configured to generate and output a user interface for the table generation system 104 that includes controls for generating a table using the techniques described herein, as described in further detail below with respect to FIG. 6.

Data generated by the table generation system 104, such as tables 106 and 108, may be stored in storage of the computing device 102, as described in further detail below with respect to FIG. 9. Alternatively or additionally, the table generation system 104 is configured to provide the tables 106 and 108 to a remote storage location for subsequent retrieval and/or access by the computing device 102 or different computing devices. For instance, the table generation system 104 may communicate information to remote storage 118, or directly to a different computing device, via network 120.

Having considered an example digital medium environment, consider now a discussion of an example system useable to generate and output tables including skewed rows or columns, shifted rows or columns, and combinations thereof in accordance with aspects of the disclosure herein.

Figure 2:
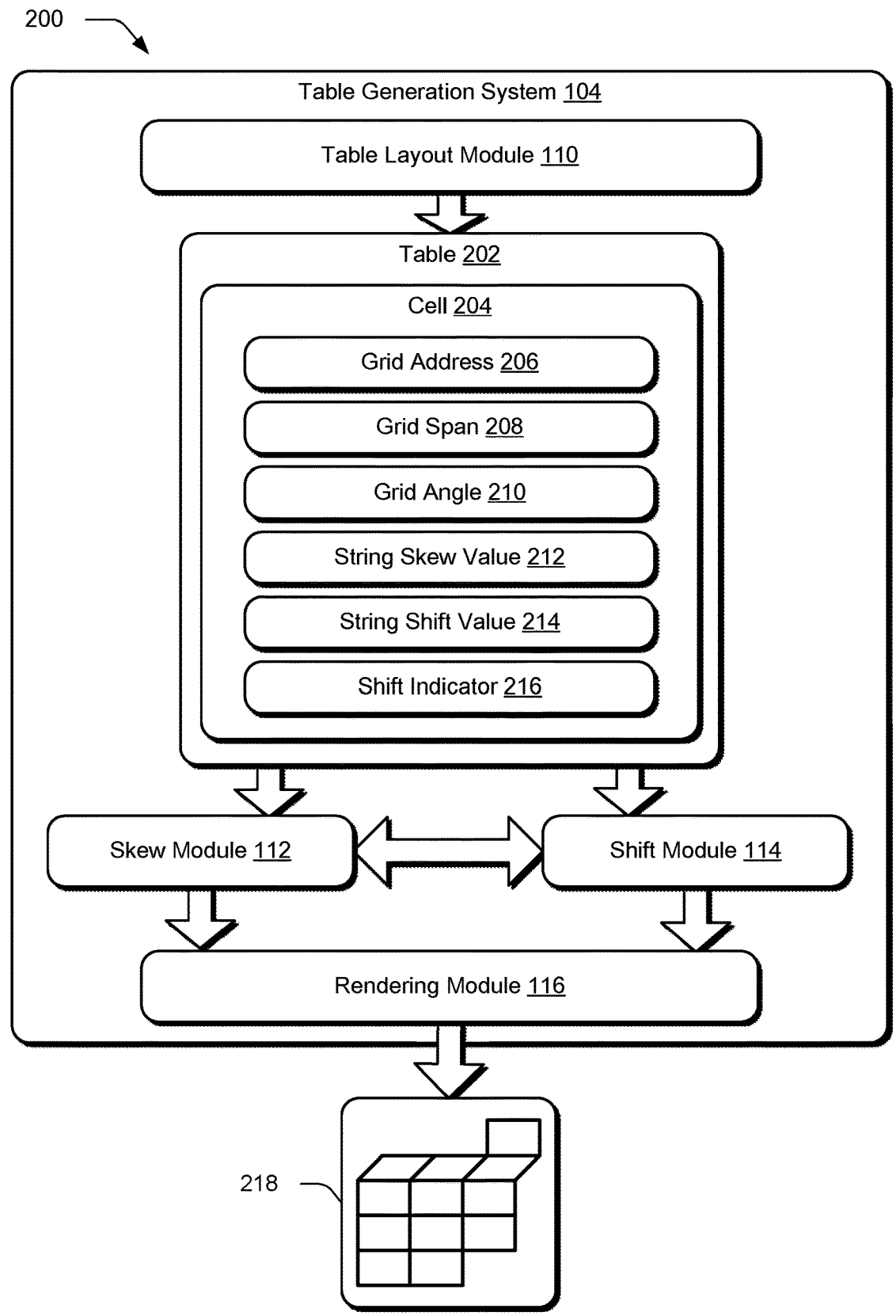
FIG. 2 illustrates an example implementation in which table generation system of FIG. 1 generates a table with one or more shifted or skewed cells using techniques described herein.

FIG. 2 illustrates an example system 200 useable to generate a table that includes at least one shifted row or column, at least one skewed row or column, or combinations thereof, using the techniques described herein. In the illustrated example, system 200 includes modules of the table generation system 104 as described with respect to FIG. 1, e.g., table layout module 110, skew module 112, shift module 114, and rendering module 116. System 200 may be implemented on any suitable device or combination of devices. In one example, system 200 is implemented on one computing device (e.g., computing device 102 of FIG. 1). In another example, system 200 is implemented on more than one computing device, as described in further detail below with respect to FIG. 9.

In the example system 200, the table layout module 110 generates table 202 with at least one cell 204 arranged in a grid that can be described as an arrangement of the cells 204 in rows and columns. To enable generation of a table 202 with skewed or shifted cells, the table layout module 110 is configured to define a visual appearance of each cell 204 using a set of cell properties, which include a grid address 206, a grid span 208, a grid angle 210, a string skew value 212, a string shift value 214, and a shift indicator 216.

The grid address 206 includes data describing coordinates for a row and a column of the table 202 in which an upper left corner of the cell 204 is located. For instance, a grid address 206 of an upper left cell of the table 202 (e.g., located in the first column and first row of the table) may be specified numerically as (0,0). A grid address for a cell located below the upper left cell of the table 202 (e.g., located in the first column and second row of the table) may be specified numerically as (1,0), while a cell located to the right of the upper left cell of table 202 (e.g., located in the second column and first row of the table) may be specified numerically as (0,1). In this manner, the grid address 206 represents an abstraction that is useable by the table generation system 104 to identify a location of the cell 204 within the table 202.

The grid span 208 includes data describing a number of rows or columns of the table 202 across which the cell 204 spans, relative to the row and column indicated by the grid address 206. For instance, consider an example scenario where the table 202 includes three columns and five rows of cells, with the three cells of the top row merged together to create a single cell 204 in which a header or title or the table 202 is displayed. In such a scenario, the grid address 206 for the cell 204 will indicate that the cell corresponds to an upper left corner of the table 202 and the grid span 208 will indicate that the cell spans across three rows of the table 202, and may be represented numerically as (1,3). Conversely, in an example scenario where the cell 204 occupies only one column and only one row of the table 202, the grid span 208 may be represented numerically as (1,1). In another example scenario where the cell 204 occupies only one column and two rows of the table 202, the grid span 208 is represented numerically as (2,1). In this manner, the grid span 208 represents an abstraction that is useable by the table generation system 104 together with the grid address 206 to identify a location and area of the cell 204 relative to the table 202.

The grid angle 210 includes data specifying an angle at which borders of the cell 204 are skewed relative to a horizontal (e.g., x-axis) or vertical (e.g., y-axis) baseline for the table 202. By default, the grid angle 210 is set to zero, which causes the cell 204 to be a rectangle with a height defined based on dimensions for the row that includes the cell 204 and a width defined based on dimensions for the column that includes the cell 204. The grid angle 210 may be quantified in terms of degrees and expressed mathematically as g, where $-90°<g<90°$. When modified from the default of zero, the grid angle 210 specifies an angle by which the cell 204 is to be skewed relative to other cells of the table 202.

In order to indicate a direction in which the grid angle 210 skews the cell 204 (e.g., horizontally or vertically), the table layout module 110 updates the string skew value 212 to indicate whether the grid angle 210 is to be applied in a row-wise or column-wise manner. For instance, the string skew value 212 may be designated as a first value to indicate that the grid angle 210 is a default grid angle (e.g., not skewed), may be designated as a second value to indicate that the grid angle 210 should be applied to all cells of the row that includes the cell 204, or may be specified as a third value to indicate that the grid angle 210 should be applied to all cells of the column that includes the cell 204. In this manner, when the string skew value 212 indicates that the grid angle 210 is to be applied to cells of a row of the table 202, the skew module 112 is configured to draw vertical boundaries for cells of that row at an angle relative to a vertical axis for the table 202, as specified by the grid angle 210. Conversely, when the string skew value 212 indicates that the grid angle 210 is to be applied to cells of a column of the table 202, the skew module 112 is configured to draw horizontal boundaries for cells of that row at an angle relative to a horizontal axis for the table 202, as specified by the grid angle 210.

The string shift value 214 specifies an integer indicating an amount of rows or columns by which the cell 204 is to be shifted in the table 202. The shift indicator 216 specifies whether the cell 204 is to be shifted by the string shift value 214 relative to rows or columns of the table 202. In an implementation where the shift indicator 216 specifies that the cell 204 is to be shifted relative to rows of the table 202, the shift module 114 is configured to shift a position of the cells of the column of the table 202 that includes cell 204 upward when the string shift value 214 is a negative integer and downward when the string shift value 214 is a positive integer, by a number of rows equal to the integer value. In an implementation where the shift indicator 216 specifies that the cell 204 is to be shifted relative to columns of the table 202, the shift module 114 is configured to shift a position of the cells of the row of the table 202 that includes cell 204 leftward when the string shift value 214 is a negative integer and rightward when the string shift value 214 is a positive integer, by a number of columns equal to the integer value.

Thus, the grid address 206, the grid span 208, the grid angle 210, the string skew value 212, the string shift value 214, and the shift indicator 216 are representative of properties for the cell 204 that are useable by at least one of the skew module 112 or the shift module 114 to generate a table having at least one of a shifted row, a shifted column, a skewed row, or a skewed column using the techniques described herein. Although illustrated and described as including properties specifying the grid address 206, the grid span 208, the grid angle 210, the string skew value 212, the string shift value 214, and the shift indicator 216, the table layout module 110 is configured to define the visual appearance of cell 204 using a subset of these properties. For instance, in an example implementation where the table 202 includes only skewed cells and does not include any shifted cells, the table layout module may configure the cell to include the grid address 206, the grid span 208, the grid angle 210, and the string skew value 212, without including the string shift value 214 or the shift indicator 216. In another example implementation where the table 202 includes only shifted cells and does not include any skewed cells, the table layout module 110 may configure the cell to include the grid address 206, the grid span 208, the string shift value 214, and the shift indicator 216, without including the grid angle 210 or the string skew value 212.

The table 202, with modifications applied by one or more of the skew module 112 or shift module 114, is then communicated to the rendering module 116 for output, represented by table 218. In some implementations, the rendering module 116 may output the table 218 for display at a device implementing the table generation system 104, such as computing device 102 illustrated in FIG. 1. Alternatively or additionally, the rendering module 116 may communicate the table 218 to a different computing device or remote storage location, such as via network 120 illustrated in FIG. 1.

Having considered example details of generating a table with skewed and shifted cells, consider now example tables generated by the table generation system 104 in accordance with the techniques described herein.

Figure 3:
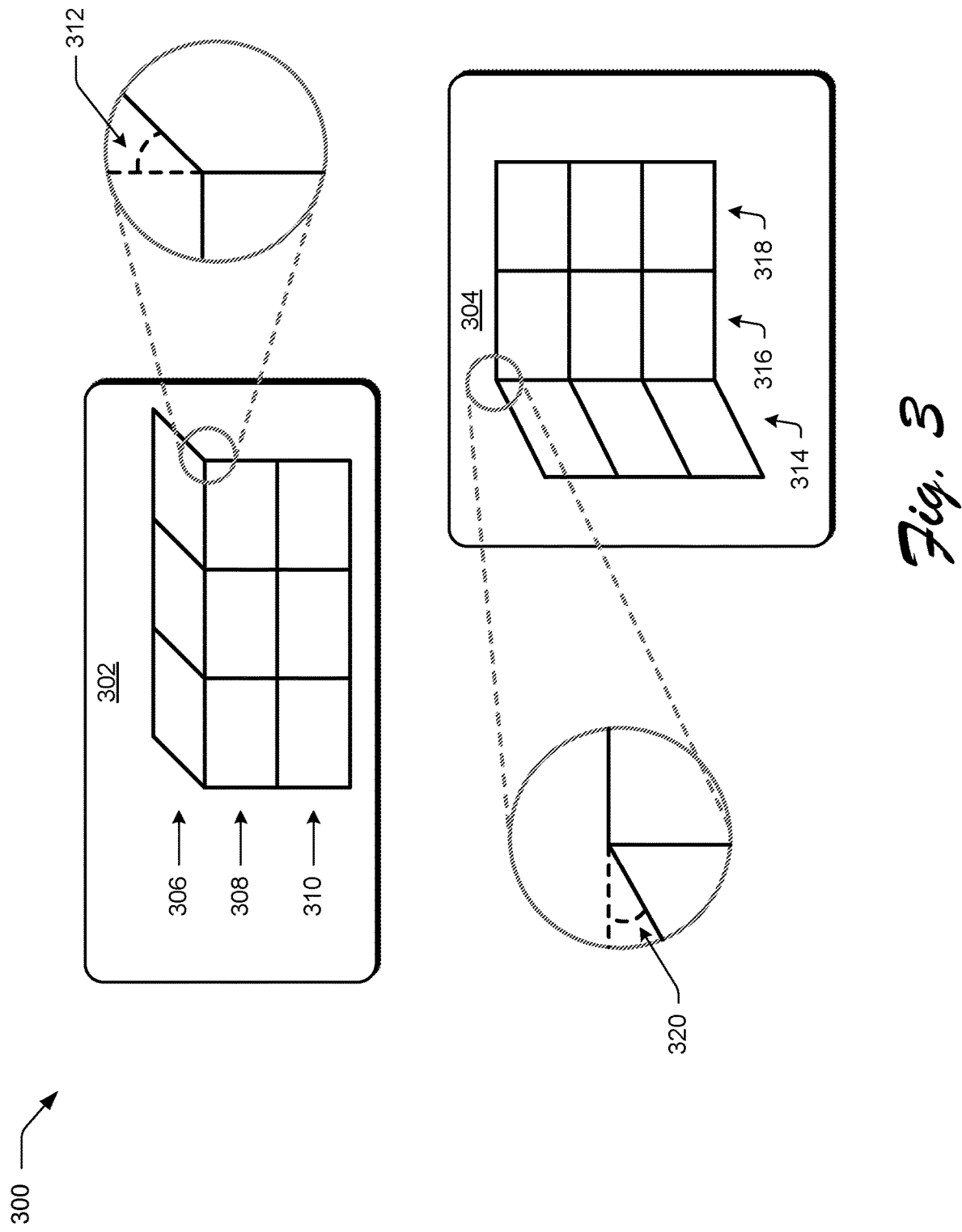
FIG. 3 illustrates an example implementation of a table with skewed cells generated by the table generation system of FIG. 1.

FIG. 3 illustrates an example implementation 300 of tables that include skewed cells generated by the skew module 112 of the table generation system 104 in accordance with the techniques described herein. The illustrated example 300 includes tables 302 and 304. Table 302 represents an instance of a table 202 that includes cells 204 skewed in a row-wise manner. For instance, table 302 includes row 306, row 308, and row 310, where cells of the row 306 are skewed by an angle 312. In this manner, cells included in row 306 are representative of cell 204 as illustrated in FIG. 2, with each of the cells having a grid angle 210 that corresponds to the angle 312 and a string skew value 212 indicating that the vertical borders of the cells are to be skewed relative to a vertical axis for the table by the angle 312.

Table 304 represents an instance of a table 202 that includes cells 204 skewed in a column-wise manner. For instance, table 304 includes column 314, column 316, and column 318, where cells of the column 314 are skewed by an angle 320. In this manner, cells included in column 314 are representative of cell 204 as illustrated in FIG. 2, with each of the cells having a grid angle 210 that corresponds to the angle 320 and a string skew value 212 indicating that the horizontal borders of the cells are to be skewed relative to a horizontal axis for the table by the angle 320.

To enable scaling of the table 302 or 304, such as by adding additional rows or columns to the table, each cell in the new row or column is automatically assigned the value of the grid angle 210 from its adjacent cells. For instance, in an example scenario where a new column is added to table 302, a cell of the new column in row 306 is assigned a grid angle 210 corresponding to the angle 312, while cells of the new columns in rows 308 and 310 are assigned default grid angles 210. In another example scenario where a new row is added to table 304, a cell of the new row in column 314 is assigned a grid angle 210 corresponding to the angle 320, while cells of the new row in columns 316 and 318 are assigned default grid angles 210. Similarly, each cell of newly added rows and columns are assigned string skew values 212 to indicate whether a row or column in which the cell is included is modified from a default angle by the grid angle 210, thereby propagating a skewed style of the table for any number of additional rows and columns added to the table.

In an implementation where a cell that is skewed by a grid angle 210 includes a display of text, the skew module 112 is further configured to manipulate the text to align with the grid angle 210 without manipulating an underlying model for the text itself. To do so, the skew module 112 adjusts a baseline for text included in a cell using the grid angle 210. Known techniques for drawing tables represent text included in individual table cells as chunks of data, with a parameter indicating a baseline for the text chunk. The skew module 112 is configured to modify this baseline parameter for text chunks of any cell skewed by the grid angle 210, such that the baseline parameter for the text chunk is aligned with the grid angle 210.

Having considered example implementations of generating a table with one or more skewed cells, consider now examples of generating tables with one or more shifted cells in accordance with the techniques described herein.

Figure 4:
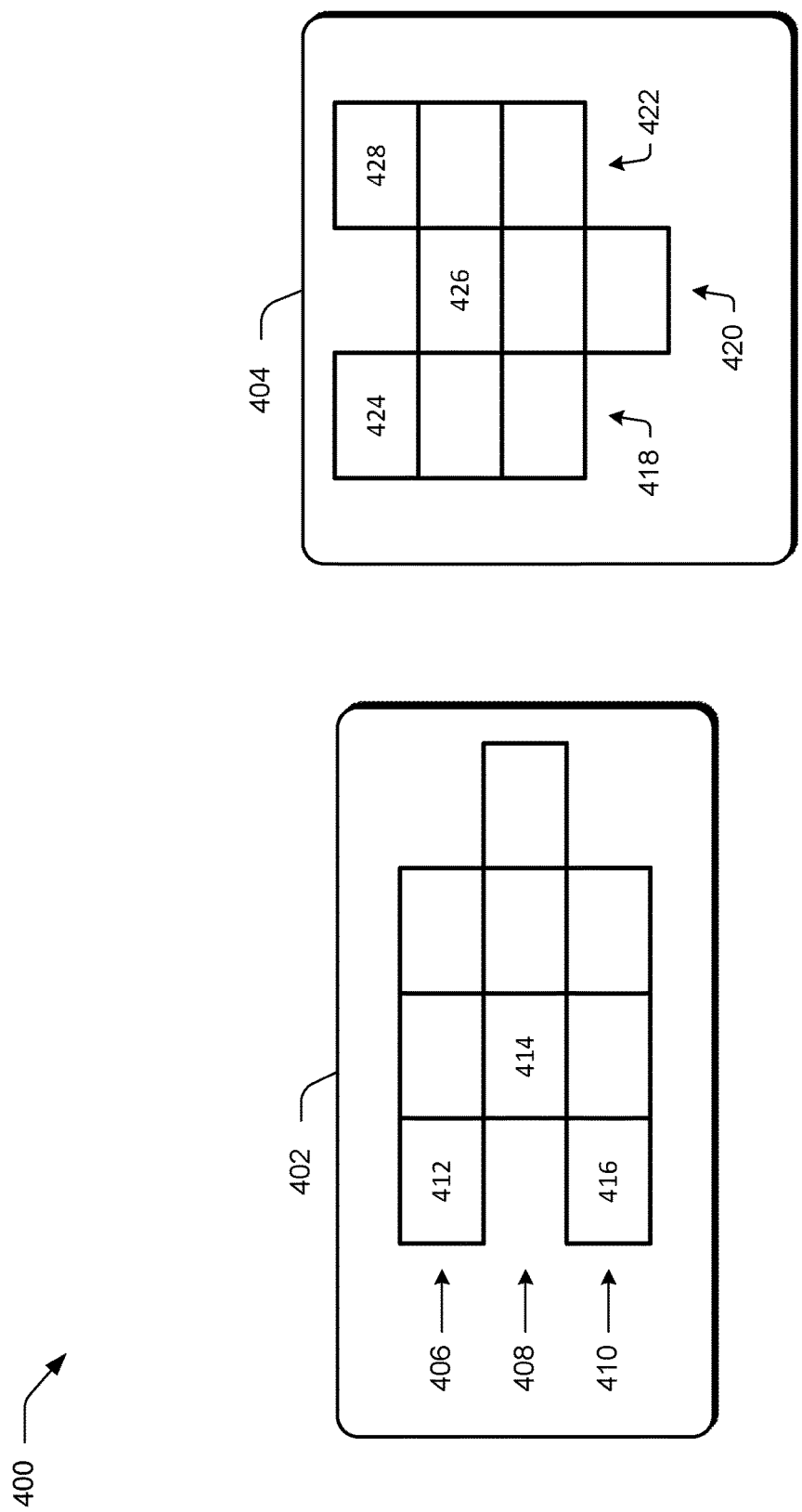
FIG. 4 illustrates an example implementation of a table with shifted cells generated by the table generation system of FIG. 1.

FIG. 4 illustrates an example implementation 400 of tables generated by the shift module 114 of the table generation system 104 that include shifted cells in accordance with the techniques described herein. The illustrated example 400 includes tables 402 and 404. Table 402 represents an instance of a table 202, as illustrated in FIG. 2, which includes cells 204 shifted relative to columns of the table 402. For instance, table 402 includes row 406, row 408, and row 410, where cell 414 has been shifted relative to an original alignment in a column with cells 412 and 416. In this manner, cell 414 and other cells included in row 408 are each representative of cell 204 as illustrated in FIG. 2, with a string shift value 214 of one and a shift indicator 216 noting that the cell is to be shifted relative to columns of the table 402 by the string shift value 214.

Table 404 represents an instance of a table 202 that includes cells 204 shifted relative to rows of the table 404. For instance, table 404 includes column 418, column 420, and column 422, where cell 426 has been shifted relative to an original alignment in a row with cells 424 and 428. In this manner, cell 426 and other cells included in column 420 are each representative of cell 204 as illustrated in FIG. 2, with a string shift value of two and a shift indicator 216 noting that the cell is to be shifted across rows of the table 404 by the string shift value 214.

To preserve intuitive navigation operations among shifted cells of the tables 402 and 404, the shift module 114 is further configured to modify the grid address 206 for each cell subjected to a shift as indicated by its string shift value 214. To do so, the shift module 114 modifies the grid address 206 according to Algorithm 1.

---
Algorithm 1
---
```
If StringShiftValue = = row, then for the cell:
    GridCoord.row = GridCoord.row
    GridCoord.column = GridCoord.column + StringShiftValue
If StringShiftValue = = column, then for the cell:
    GridCoord.row = GridCoord.row + StringShiftValue
    GridCoord.column = GridCoord.column
```
---

Using Algorithm 1, the grid address 206 for a cell can be represented as (GridCoord.row, GridCoord.column). In this manner, following the shift operation to generate table 402, cell 412 may have a grid address of (1, 1), cell 414 may have a grid address of (2, 2), and cell 416 may have a grid address of (3, 1). Similarly, following the shift operation to generate table 404, cell 424 may have a grid address of (1, 1), cell 426 may have a grid address of (2, 2), and cell 428 may have a grid address of (1, 3).

By updating the grid address 206 for each cell in a table subject to a shift operation, the shift module 114 ensures that known table navigation approaches are preserved in that they remain applicable to a table generated by the table generation system 104. For instance, Algorithm 2 represents conventional approaches to navigating among cells of a table using left, right, up, and down arrow keys.

---
Algorithm 2
---
```
Switch (key press)
{
case 'Right arrow':
    Move to cell with
        GridCoord.row = current cell GridCoord.row
        GridCoord.column = GridCoord.column + 1
case 'Left arrow':
    Move to cell with
        GridCoord.row = current cell GridCoord.row
        GridCoord.column = GridCoord.column − 1
case 'Up arrow':
    Move to cell with
        GridCoord.row = GridCoord.row − 1
        GridCoord.column = current cell GridCoord.column
case 'Down arrow':
    Move to cell with
        GridCoord.row = GridCoord.row +1
        GridCoord.column = current cell GridCoord.column
}
```
---

In this manner, when cell 412 of table 402 is currently selected, a down arrow input will navigate from cell 412 to cell 416. When cell 424 of table 404 is selected, a right arrow input will navigate from cell 424 to cell 428. In addition to enabling logical and intuitive navigation of tables that include one or more shifted rows or shifted columns, modifying the grid address 206 of cells subject to a shift operation further enables selection of rows and columns when the table is shifted. For instance, in response to receiving an input selecting the left-most column of table 402, cells 412 and 416 would be selected without selection of cell 414. Likewise, in response to receiving an input selecting the top row of table 404, cells 424 and 428 would be selected, without selection of cell 426. For tables having skewed cells, such as table 218 generated by the skew module 112, known cell selection operations remain unaffected, as changing a grid angle 210 for a cell does not alter the cell's grid address 206.

Figure 5:
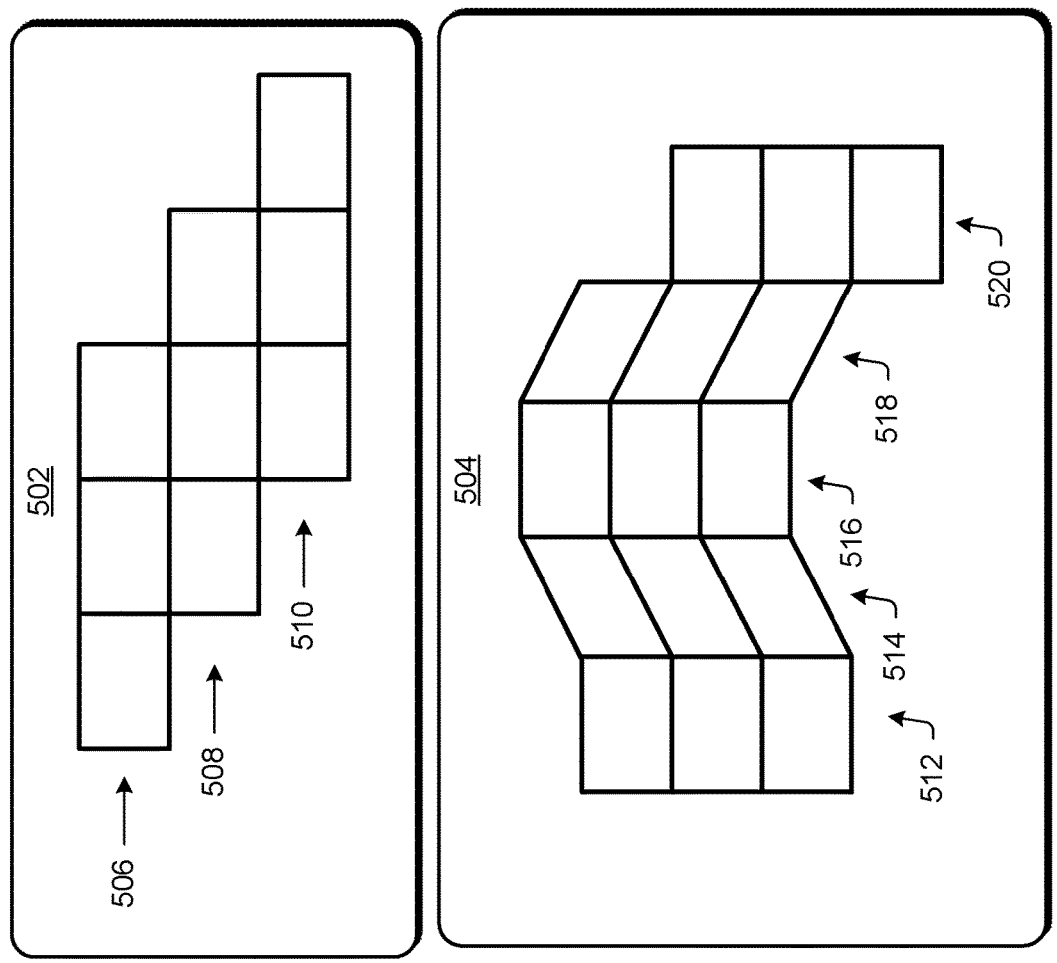
FIG. 5 illustrates an example implementation of tables generated by the table generation system of FIG. 1.

Although FIGS. 3 and 4 are described and illustrated in the context of skewing or shifting a single row or column of cells in a table, the table generation system 104 is configured to employ the techniques described herein to generate a table including any number of skewed and shifted rows and columns. FIG. 5 illustrates an example implementation 500 of tables that include multiple rows and multiple columns subjected to modification by at least one of the skew module 112 or the shift module 114. For instance, the illustrated example 500 includes tables 502 and 504.

Table 502 is representative of a table 202 generated by the table generation system 104 that includes multiple rows shifted by different string shift values 214. Specifically, table 502 includes row 506, row 508, and row 510, where row 506 is not shifted (e.g., cells of row 506 each include a default string shift value 214), while row 508 is shifted by a first amount and row 510 is shifted by a second amount. In the illustrated example, cells of row 508 each have an associated string shift value 214 of a first magnitude and a shift indicator 216 that specifies the string shift value 214 should be applied relative to columns across a row in which the cell is included.

Table 504 is representative of a table 202 generated by the table generation system 104 that includes multiple columns skewed by different grid angles 210 and at least one column shifted by a string shift value 214. Specifically, table 504 includes column 512, column 514, column 516, column 518, and column 520. In the illustrated example, columns 512, 516, and 520 each include three cells that are not skewed (e.g., cells of columns 512, 516, and 520 each include a default grid angle 210). Cells of column 514 are illustrated as being skewed by a first grid angle and cells of column 518 are illustrated as being skewed by a second grid angle, with cells of both columns 514 and 518 having an associated string skew value 212 indicating that the corresponding grid angle 210 for the column is to be applied to all cells of the column. Cells of column 520 are shifted in a according to a string shift value 214, with corresponding shift indicators 216 specifying that the string shift value 214 should be applied relative to rows across the column 520. Thus, table 504 is representative of a collaborative effort between skew module 112 and shift module 114 to output a table that includes both shifted and skewed cells in accordance with the techniques described herein.

Having considered example implementations of tables with shifted and skewed cells, consider now an example user interface useable to generate such tables in accordance with the techniques described herein.

Figure 6:
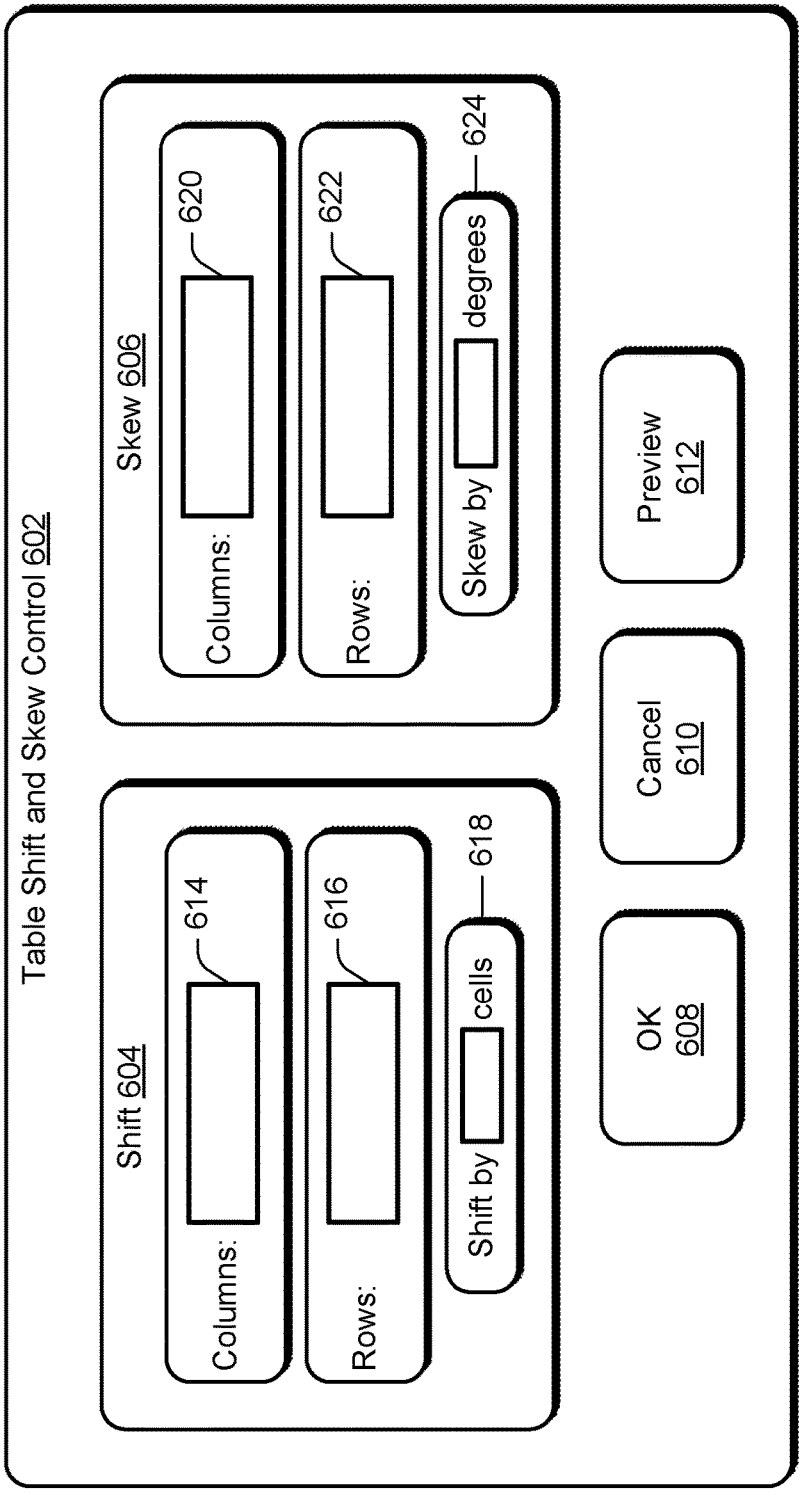
FIG. 6 illustrates an example implementation of a user interface for the table generation system of FIG. 1.

FIG. 6 illustrates an example implementation 600 of a user interface for the table generation system 104. The illustrated example includes a table shift and skew control 602 that includes various portions for generating a table with at least one shifted row, shifted column, skewed row, or skewed row. For instance, the table shift and skew control 602 includes a shift portion 604 and a skew portion 606 that are each useable to shift and skew cells of a table 202, respectively. The table shift and skew control 602 further includes selectable controls for previewing, applying, and canceling shift and skew operations that would otherwise be applied via input at the shift portion 604 and/or the skew portion 606. For instance, selectable controls may include OK control 608, cancel control 610, and preview control 612, which are selectable to accept, reject, or preview modifications, respectively, made via input at the shift portion 604 and/or the skew portion 606.

To enable a user of the computing device implementing the table generation system 104 to skew cells of a table, the shift portion 604 includes field 614 and field 616, which are respectively configured to receive input specifying one or more columns or one or more rows of a table to be shifted by the shift module 114. The shift portion 604 further includes field 618, which is configured to receive input specifying an integer to be used as the string shift value 214. Cells of the column(s) or row(s) indicated via field 614 or 616 are assigned a shift indicator 216 based on which field 614 or 616 includes input, such that input to field 614 results in the shift indicator 216 specifying that the cells are to be shifted relative to rows of the table and input to field 616 results in the shift indicator 216 specifying that the cells are to be shifted relative to columns of the table.

The skew portion 606 includes fields 620 and 622, which are configured to receive input specifying one or more columns or one or more rows, respectively, or a table that are to be skewed by the skew module 112. The skew portion 606 further includes field 624, which is configured to receive input specifying a numerical value to be used as the grid angle 210. Cells of the column(s) or row(s) indicated via field 620 or 622 are assigned a string skew value 212 based on which field 620 or 622 includes input, such that input to field 620 results in vertical borders of the cell being skewed by the grid angle 210 and input to field 622 results in horizontal borders of the cell being skewed by the grid angle 210.

Having considered example techniques for generating tables with shifted and skewed cells, consider now some example procedures to illustrate aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-6.

Figure 7:
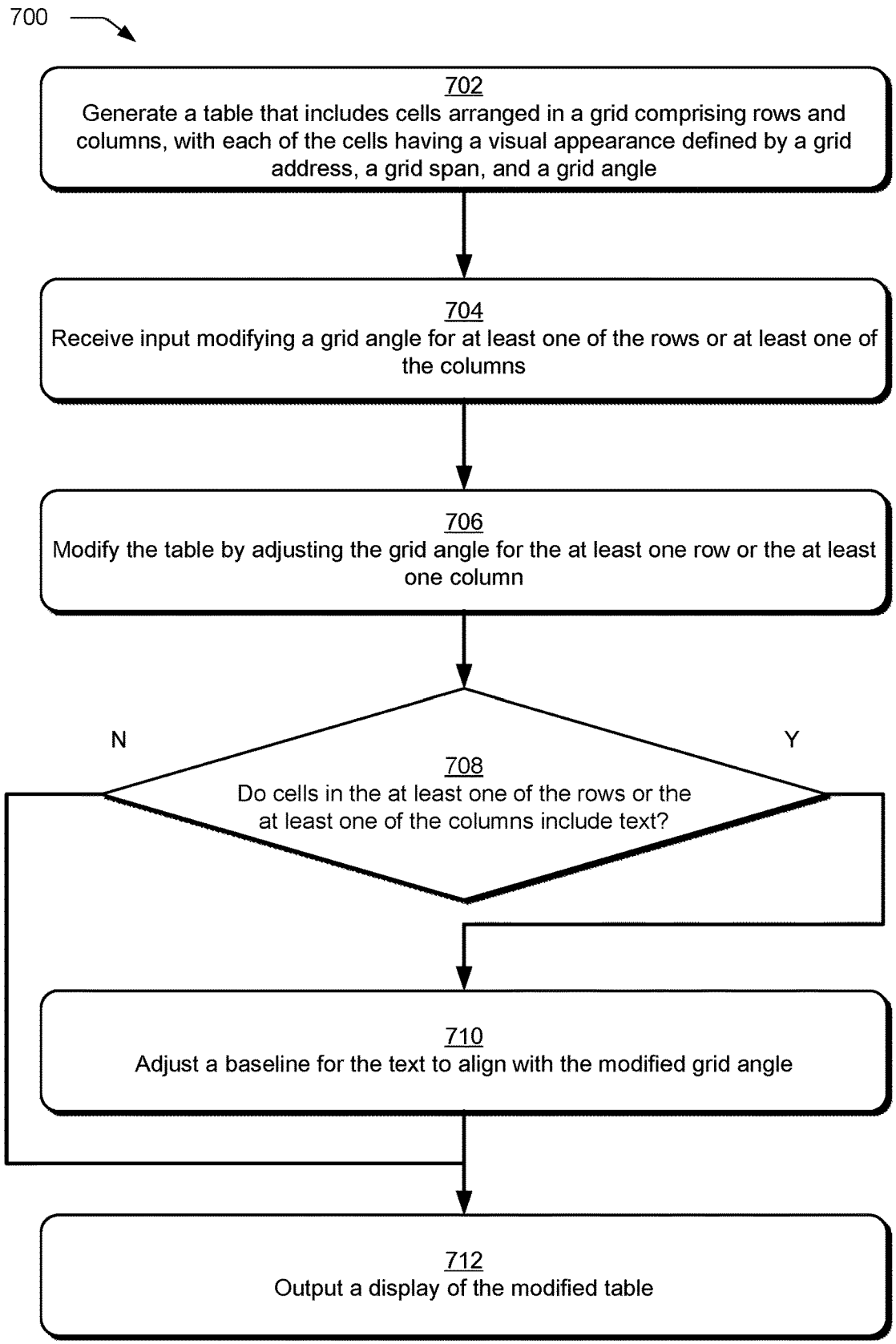
FIG. 7 is a flow diagram depicting a procedure in an example implementation for generating a table with skewed cells using the techniques described herein.

FIG. 7 depicts procedure 700 in an example implementation of generating a table that includes at least one skewed row of cells or column of cells using the techniques described herein. A table is generated that includes cells arranged in a grid comprising rows and columns, with each of the cells having a visual appearance defined by a grid address, a grid span, and a grid angle (block 702). The table layout module 110 of the table generation system 104, for instance, generates table 202 with cells 204 arranged in at least one row and at least one column and defines a visual appearance of each cell 204 using a grid address 206, a grid span 208, and a grid angle 210. The table layout module 110 is further configured to specify a string skew value 212 for each cell 204, which is useable by the skew module 112 to apply the grid angle 210 to either vertical or horizontal borders of the cell 204.

Input is received modifying a grid angle for at least one of the rows or at least one of the columns (block 704). For instance, input may be received at a skew portion 606 of the table shift and skew control 602 output as part of a user interface for the table generation system 104. The received input may specify a numerical value between zero and 90, exclusive, to be used as a grid angle 210 for cells of one or more columns indicated in field 620 or one or more rows indicated in field 622 of the skew portion 606 of the table shift and skew control 602.

The table is then modified by adjusting the grid angle for cells of the one or more rows or one or more columns specified by the input (block 706). The skew module 112, for instance, adjusts the grid angle 210 for each cell included in the row(s) or column(s) specified via input at the skew portion 606 of the table shift and skew control 602. In an implementation where the input specifies cells of one or more rows to be skewed, the skew module 112 further adjusts the string skew value 212 for the cells to indicate that vertical borders of the cells should be skewed by the grid angle 210. Conversely, in an implementation where the input specifies cells of one or more columns to be skewed, the skew module adjusts the string skew value 212 for the cells to indicate that horizontal borders of the cells should be skewed by the grid angle 210.

A determination is made as to whether cells in the one or more rows or the one or more columns skewed by the grid angle include text (block 708). In response to determining that one or more cells in the row(s) or column(s) skewed by the grid angle include text, a baseline is adjusted for the text to align with the modified grid angle (block 710). The skew module 112, for instance, identifies one or more text chunks representative of textual information included in the cells and modifies a baseline parameter for text chunks of any cell skewed by the grid angle 210 such that the baseline parameter is aligned with the grid angle 210.

In response to determining that cells in the row(s) or column(s) skewed by the grid angle do not include text, or subsequent to adjusting the baseline for text as described with respect to block 710, a display of the modified table is output (block 712). The rendering module 116, for instance, outputs a display of a table that includes at least one shifted row, shifted column, skewed row, or skewed column, such as a display of table 106, table 108, table 218, table 302, table 304, table 402, table 404, table 502, or table 504, combinations thereof, and so forth.

Figure 8:
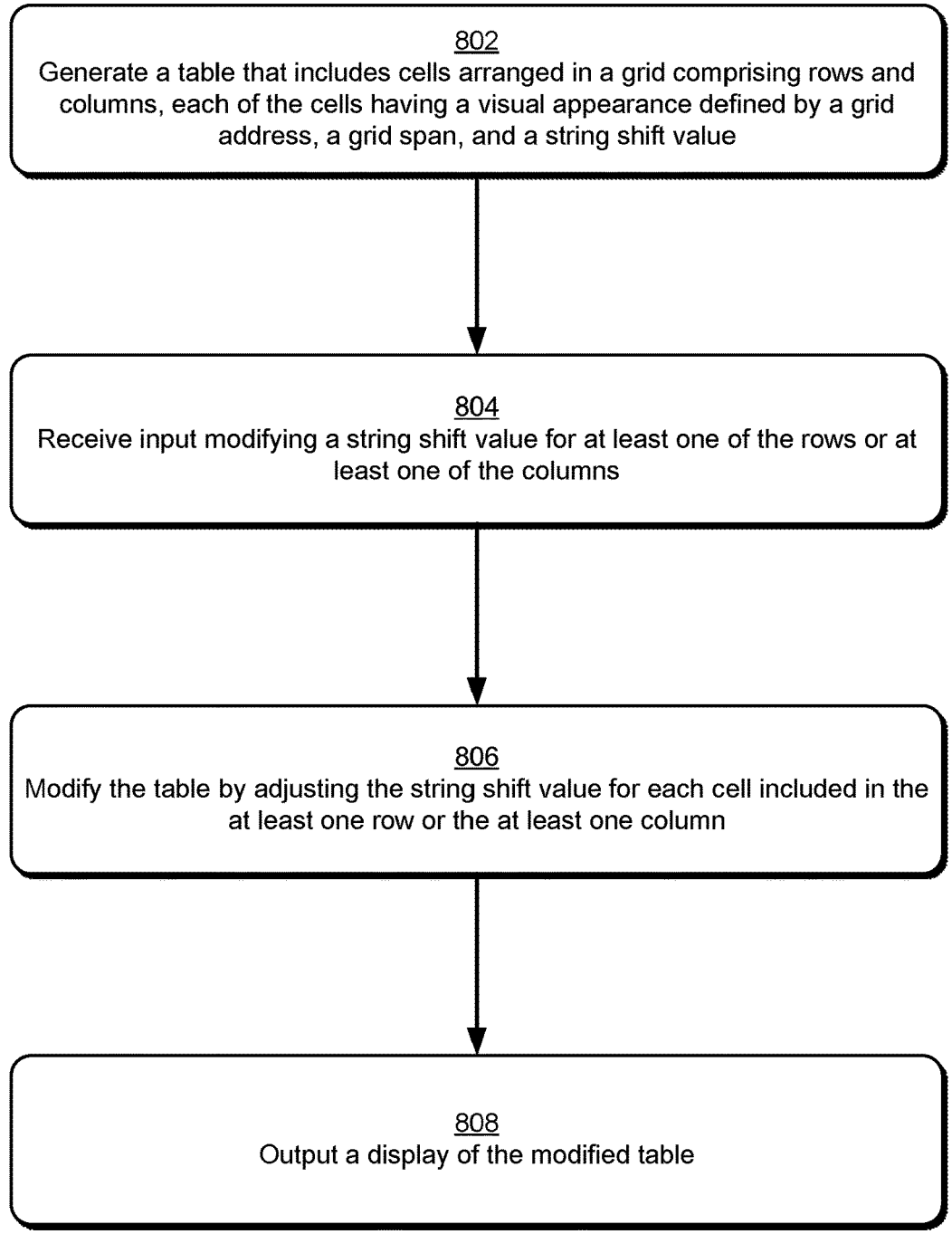
FIG. 8 is a flow diagram depicting a procedure in an example implementation for generating a table with shifted cells using the techniques described herein.

FIG. 8 depicts a procedure 800 in an example implementation of generating a table that includes at least one shifted row of cells or column of cells using the techniques described herein. A table is generated that includes cells arranged in a grid comprising rows and columns, with each of the cells having a visual appearance defined by a grid address, a grid span, and a string shift value (block 802). The table layout module 110 of the table generation system 104, for instance, generates table 202 with cells 204 arranged in at least one row and at least one column and defines a visual appearance of each cell 204 using a grid address 206, a grid span 208, and a string shift value 214. The table layout module 110 is further configured to specify a shift indictor 216 for each cell 204, which is useable by the shift module 114 to apply the string shift value 214 to a row or column in which the cell 204 is included.

Input is received modifying a string shift value for at least one of the rows or at least one of the columns (block 804). For instance, input may be received at a shift portion 604 of the table shift and skew control 602 output as part of a user interface for the table generation system 104. The received input may specify an integer value to be used as the string shift value 214 of cells of one or more columns indicated in field 614 or cells of one or more rows indicated in field 616 of the shift portion 604 of the table shift and skew control 602.

The table is then modified by adjusting the string shift value for each cell included in the at least one row or the at least one column (block 806). The shift module 114, for instance, adjusts the string shift value 214 for each cell included in the row(s) or column(s) specified via input at the shift portion 604 of the table shift and skew control 602. In an implementation where the input specifies cells of one or more rows to be shifted by the string shift value 214, the shift module 114 modifies the shift indicator 216 for cells of the one or more rows to indicate that the one or more rows are to be shifted by the string shift value 214 across columns of the table 202. Conversely, in an implementation where the input specifies cells of one or more columns to be shifted by the string shift value 214, the shift module 114 modifies the shift indicator 216 for cells of the one or more columns to indicate that the one or more columns are to be shifted by the string shift value 214 across rows of the table 202.

A display of the modified table is then output (block 808). The rendering module 116, for instance, outputs a display of a table that includes at least one shifted row, shifted column, skewed row, or skewed column, such as a display of table 106, table 108, table 218, table 302, table 304, table 402, table 404, table 502, or table 504, combinations thereof, and so forth.

Having described example procedures in accordance with one or more implementations, consider now an example system and device that can be utilized to implement the various techniques described herein.

Example System and Device

Figure 9:
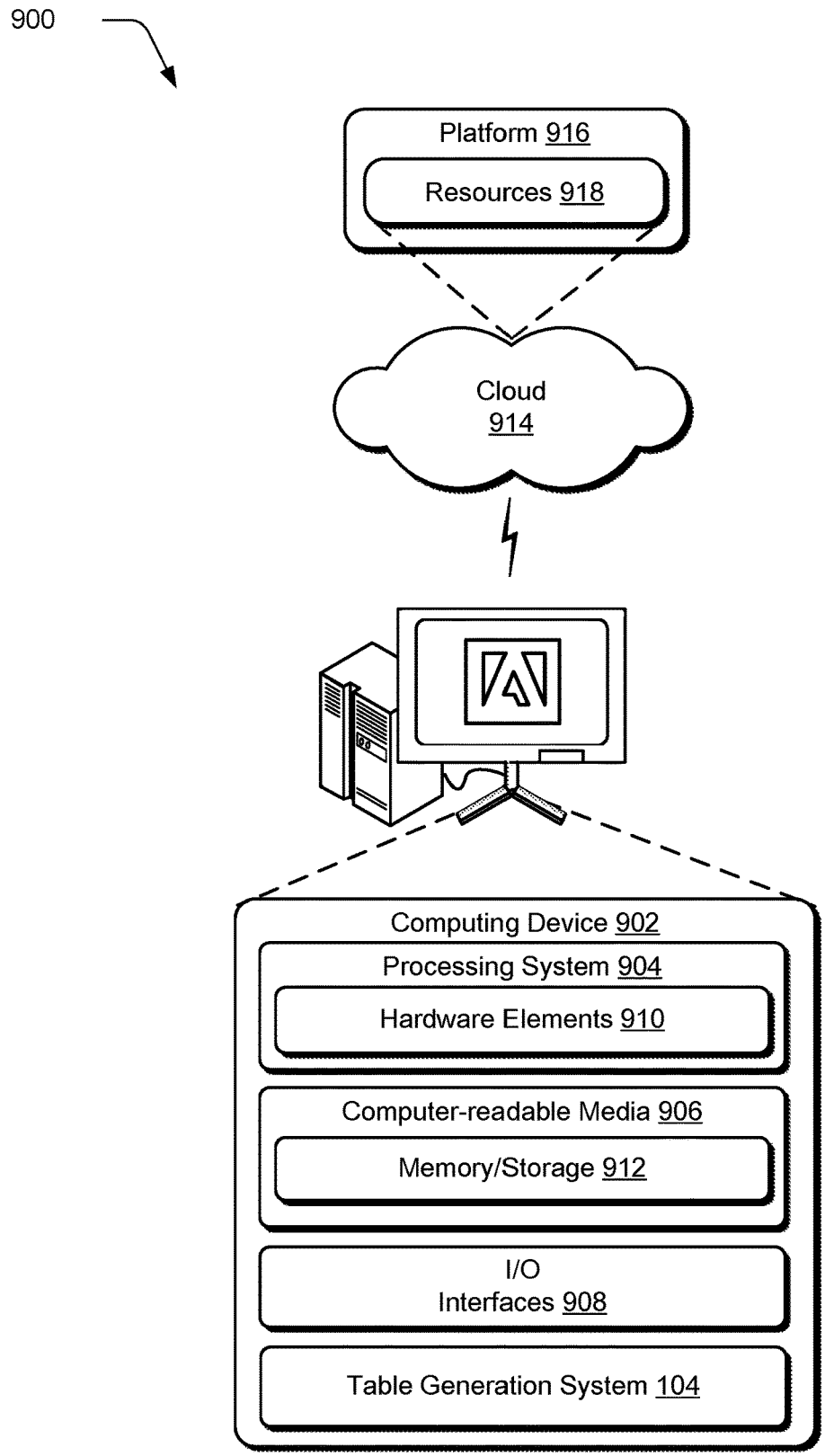
FIG. 9 illustrates an example system including various components of an example device that can be implemented as a computing device as described and/or utilized with reference to FIGS. 1-8 to implement the techniques described herein.

FIG. 9 illustrates an example system generally at 900 that includes an example computing device 902 that is representative of one or more computing systems and/or devices that may implement the various techniques described herein. This is illustrated through inclusion of the table generation system 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for generating a table structure, a method implemented by at least one computing device, the method comprising:
   generating, by the at least one computing device, a table that includes cells arranged in a grid comprising rows and columns, each of the cells having a visual appearance defined by a grid address, a grid span, and a grid angle;
   outputting, by the at least one computing device, a display of the table;
   receiving, by the at least one computing device, input modifying a grid angle for one or more of the rows or one or more of the columns; and
   modifying, by the at least one computing device, the display of the table by adjusting the grid angle for each cell included in the one or more of the rows or the one or more of the columns responsive to receiving the input.

2. The method as recited in claim 1, wherein the grid address indicates coordinates for one of the rows and one of the columns in which an upper left corner of the cell is located.

3. The method as recited in claim 1, wherein the grid span describes a number of the columns across which the cell spans or a number of the rows across which the cell spans.

4. The method as recited in claim 1, wherein the grid angle specifies an amount of degrees by which the one or more of the rows or the one or more of the columns are to be skewed relative to a default angle.

5. The method as recited in claim 1, wherein the grid address for each cell further includes a string skew value that indicates whether one of the rows in which the cell is included, whether one of the columns in which the cell is included, or neither are skewed by the modified grid angle.

6. The method as recited in claim 5, further comprising receiving a request to add a new row adjacent to a cell having a string skew value indicating that the one of the rows in which the cell is included is skewed by a modified grid angle and adding the new row to the table, wherein cells of the new row are assigned the string skew value and the modified grid angle of an adjacent cell in the one of the rows.

7. The method as recited in claim 5, further comprising receiving a request to add a new column adjacent to a cell having a string skew value indicating that the one of the columns in which the cell is included is skewed by a modified grid angle and adding the new column to the table, wherein cells of the new column are assigned the string skew value and the modified grid angle of an adjacent cell in the one of the columns.

8. The method as recited in claim 1, further comprising determining that a cell included in the one or more of the rows or the one or more of the columns with the modified grid angle includes text and modifying a baseline for the text to align with the modified grid angle.

9. The method as recited in claim 1, wherein the default grid angle for each cell is zero degrees, a minimum grid angle for each cell is greater than negative ninety degrees, and a maximum grid angle for each cell less than is ninety degrees.

10. In a digital medium environment for generating a table structure, a method implemented by at least one computing device, the method comprising:
    generating, by the at least one computing device, a table that includes cells arranged in a grid comprising rows and columns, each of the cells having a visual appearance defined by a grid address, a grid span, and a string shift value;
    outputting, by the at least one computing device, a display of the table;
    receiving, by the at least one computing device, input selecting one or more of the columns or one or more of the rows and a value by which the one or more of the columns or the one or more of the rows is to be shifted; and
    modifying, by the at least one computing device, the display of the table by adjusting the string shift value for each cell included in the one or more columns or the one or more rows and shifting cells of the one or more columns or the one or more rows across the grid by the string shift value.

11. The method as recited in claim 10, wherein the grid address indicates coordinates for one of the rows and one of the columns in which an upper left corner of the cell is located.

12. The method as recited in claim 11, wherein the input specifies that the one or more columns are to be shifted by the string shift value, the method further comprising modifying the grid address for each cell included in the one or more columns by incrementing the coordinates for the one of the rows in which the upper left corner of the cell is located based on the string shift value.

13. The method as recited in claim 11, wherein the input specifies that the one or more rows are to be shifted by the string shift value, the method further comprising modifying the grid address for each cell included in the one or more rows by incrementing the coordinates for the one of the columns in which the upper left corner of the cell is located based on the string shift value.

14. The method as recited in claim 10, wherein the grid span describes a number of the columns across which the cell spans or a number of the rows across which the cell spans.

15. The method as recited in claim 10, wherein the string shift value specifies an amount of the rows or an amount of the columns in the grid by which the cell is to be shifted in the modified display.

16. The method as recited in claim 10, wherein the grid address for each cell further comprises a shift indicator that specifies whether one of the rows in which the cell is included or one of the columns in which the cell is included is shifted relative to an original position in the grid by the string shift value.

17. The method as recited in claim 16, further comprising receiving a request to add a new column adjacent to a cell having a shift indicator indicating that the one of the columns in which the cell is included is shifted by a modified string shift value and adding the new column to the table, wherein a cell of the new column sharing a border with the cell having the modified string shift value is assigned a grid address using the modified string shift value.

18. The method as recited in claim 16, further comprising receiving a request to add a new row adjacent to a cell having a shift indicator indicating that the one of the rows in which the cell is included is shifted by a modified string shift value and adding the new row to the table, wherein a cell of the new row sharing a border with the cell having the modified string shift value is assigned a grid address using the modified string shift value.

19. The method as recited in claim 10, further comprising enabling navigation among the cells using the string shift values of the modified display of the table.

20. In a digital medium environment for generating a table structure, a method implemented by at least one computing device, the method comprising:

generating, by the at least one computing device, a table that includes cells arranged in a grid comprising rows and columns, each of the cells having a visual appearance in the grid defined by a grid address, a grid span, a grid angle that specifies an amount in degrees by which the one or more of the rows or the one or more of the columns are to be skewed relative to a default angle, and a string shift value that specifies an amount of the rows or an amount of the columns in the grid by which the cell is to be shifted in the modified display; and outputting, by the at least one computing device, a display of the table.

* * * * *